US010636532B2

United States Patent
Anderson et al.

(10) Patent No.: US 10,636,532 B2
(45) Date of Patent: Apr. 28, 2020

(54) SODIUM CESIUM VAPOR TRAP SYSTEM AND METHOD

(71) Applicant: TerraPower, LLC, Bellevue, WA (US)

(72) Inventors: Michael Anderson, Bellevue, WA (US); Thomas M. Burke, Prosser, WA (US); Robert A. Corbin, North Bend, WA (US); Christopher M. Regan, Seattle, WA (US)

(73) Assignee: TerraPower, LLC, Bellevue, PA (US)

( * ) Notice: Subject to any disclaimer, the term of this patent is extended or adjusted under 35 U.S.C. 154(b) by 58 days.

(21) Appl. No.: 15/600,178

(22) Filed: May 19, 2017

(65) Prior Publication Data

US 2017/0337995 A1 Nov. 23, 2017

Related U.S. Application Data

(60) Provisional application No. 62/339,225, filed on May 20, 2016.

(51) Int. Cl.
| | |
|---|---|
| *G21C 19/303* | (2006.01) |
| *G21C 19/31* | (2006.01) |
| *G21F 9/02* | (2006.01) |
| *B01D 53/00* | (2006.01) |
| *B01D 3/14* | (2006.01) |

(52) U.S. Cl.
CPC ......... *G21C 19/303* (2013.01); *B01D 53/002* (2013.01); *G21C 19/31* (2013.01); *G21F 9/02* (2013.01); *B01D 3/14* (2013.01); *B01D 2257/10* (2013.01); *B01D 2257/93* (2013.01)

(58) Field of Classification Search
CPC .... G21C 19/303; G21C 19/31; G21C 19/313; G21C 19/307; G21F 9/02; B01D 53/04; B01D 53/0423; B01D 53/0438; B01D 3/14; B01D 3/143
USPC .................................. 96/131, 132, 134, 135
See application file for complete search history.

(56) References Cited

U.S. PATENT DOCUMENTS 3,853,504 A * 12/1974 Buscher ................. G21C 19/31
95/274

FOREIGN PATENT DOCUMENTS

| GB | 2005900 B | 4/1979 |
|---|---|---|
| JP | 1992122897 A | 4/1992 |
| JP | 1992286996 A | 10/1992 |

OTHER PUBLICATIONS

International Preliminary Report on Patentability for PCT/U2017/033578, dated May 19, 2017, 7 pages.
International Search Report and Written Opinion for PCT/US17/33578, dated Mar. 6, 2018, 16 pages.
(Continued)

*Primary Examiner* — Sharon M Davis

(57) ABSTRACT

Sodium-cesium trap systems and methods for the simultaneous removal of both sodium (Na) and cesium (Cs) in gas are provided. The trap system includes a contacting vessel having an inlet and an outlet with carrier gas channeled therethrough. A heating system maintains a temperature gradient across the contacting vessel between a first temperature at the inlet and a second temperature at the outlet such that sodium and cesium contained within the carrier gas are condensed into liquid and the carrier gas exiting the vessel is substantially free of sodium and cesium.

23 Claims, 3 Drawing Sheets

(56) References Cited

OTHER PUBLICATIONS

Barton, G.B., "Prototype Applications Loop (PAL) and Sodium Characterization System (SCS) Investigations—Vapor Trap Performance, Cover Gas Analysis and Interpretation of Analyses", Hanford Engineering Development Laboratory, Nov. 1973, 39 pages.
Romanenko et al., Immobilization of Cesium Traps from the BN-350 Fast Reactor, WM2011 Conference, Feb. 27-Mar. 3, 2011, Phoenix, AZ., pp. 1-15.
RDT Standard, Vapor Trap Assemblies for Sodium Service, Apr. 1972.
Sodium Vapor Trap Lab Poster, TerraPower LLC, Nov. 2015, 1 page.

\* cited by examiner

SODIUM CESIUM VAPOR TRAP SYSTEM AND METHOD

RELATED APPLICATIONS

This application claims the benefit of U.S. Provisional Application No. 62/339,225, filed May 20, 2016, entitled "Sodium-Cesium Vapor Trap System and Method," which is hereby incorporated by reference.

INTRODUCTION

Sodium-cooled nuclear reactors have been operated and studied in the past for their suitability for use in electricity generating nuclear power plants. One drawback identified during the operation of the research reactors was the carryover of Cs-137, a fission product, out of the liquid sodium coolant, through the sodium vapor trap, and into the vapor treatment system of the reactor. In most previous reactor designs, the consequences of cesium release were relatively small because the quantity released from a few failed fuel pins was small. However, since some modern reactors, such as Traveling Wave Reactors, currently under development are designed to operate with vented fuel pins, the quantity of cesium released to the primary sodium coolant and reactor cover gas space will be much greater.

Sodium-Cesium Vapor Trap

This disclosure describes new sodium-cesium trap systems and methods for the simultaneous removal of both sodium (Na) and cesium (Cs) in gas. The trap system includes a contacting vessel having an inlet and an outlet with carrier gas channeled therethrough. A heating system maintains a temperature gradient across the contacting vessel between a first temperature at the inlet and a second temperature at the outlet such that sodium and cesium contained within the carrier gas are condensed into liquid and the carrier gas exiting the vessel is substantially free of sodium and cesium.

These and various other features as well as advantages which characterize the sodium-cesium trap systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing introduction and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Before the sodium-cesium vapor trap systems and methods that are the subject of this disclosure are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a lithium hydroxide" is not to be taken as quantitatively or source limiting, reference to "a step" may include multiple steps, reference to "producing" or "products" of a reaction should not be taken to be all of the products of a reaction, and reference to "reacting" may include reference to one or more of such reaction steps. As such, the step of reacting can include multiple or repeated reaction of similar materials to produce identified reaction products.

This disclosure describes vapor trap systems and methods for the simultaneous removal of both Na and Cs in gas. For the purposes of this application, embodiments of a Na—Cs vapor trap will be described in the context of a sodium-cooled nuclear reactor in which the removal of Cs in carryover gas is important. However, it will be understood that the vapor trap systems and methods may be adapted for use in any context in which both Cs and Na need to be removed from a gas, not just in nuclear reactor contexts.

Figure 1:
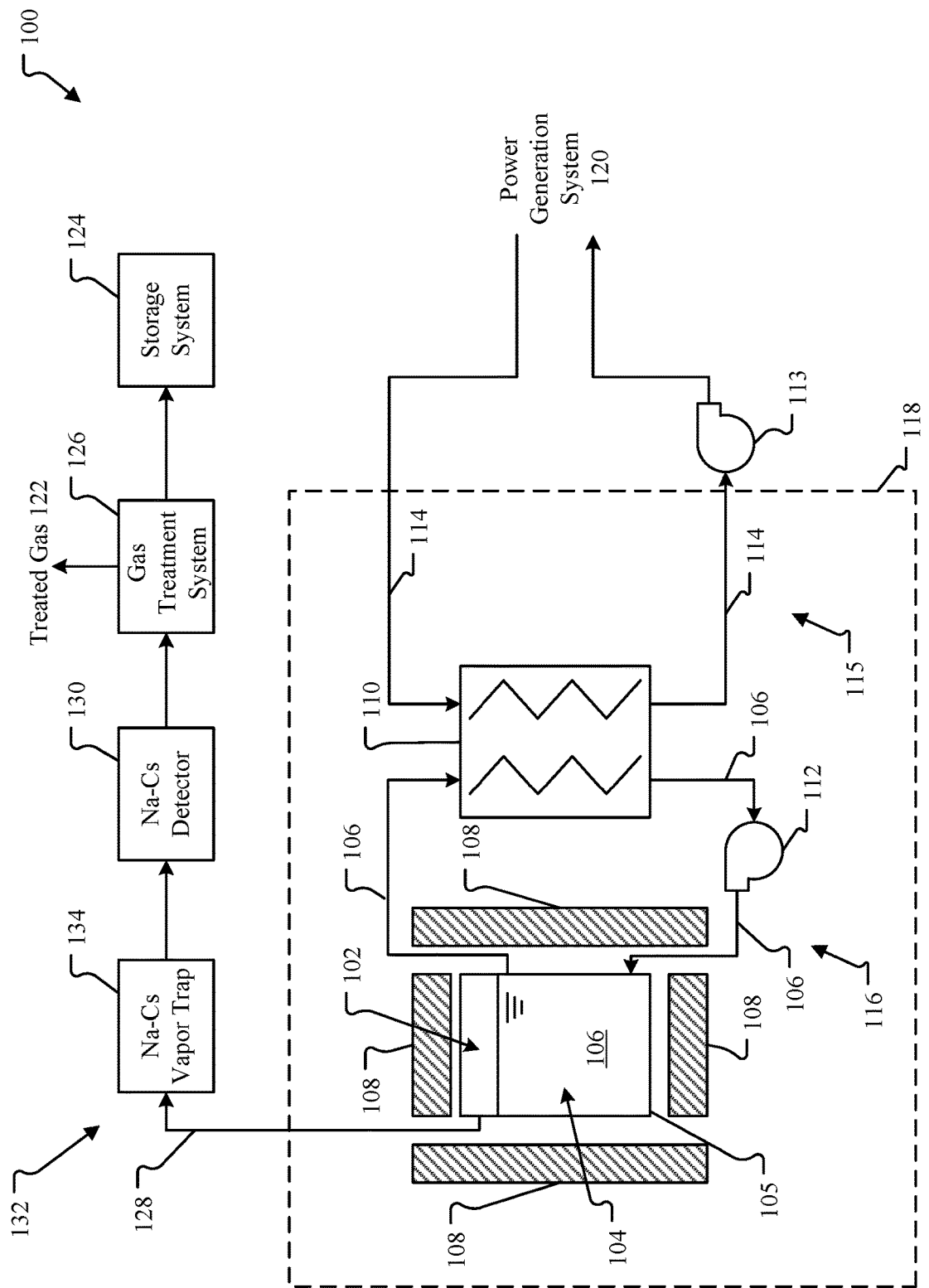
FIG. 1 illustrates, in a block diagram form, some of the basic components of a sodium-cooled nuclear reactor.

FIG. 1 illustrates, in a block diagram form, some of the basic components of a sodium-cooled nuclear reactor. In general, a reactor 100 includes a reactor core 104 in a reactor vessel 105, the core 104 containing a fissionable fuel that generates heat which is removed via a liquid coolant 106, such as sodium metal or a sodium salt. For the purposes of this disclosure, fissionable material includes any fissile material, any fertile material or combination of fissile and fertile materials and the coolant 106 is sodium metal. The fissionable fuel may be in solid or liquid form (at operating temperatures) and may or may not be held within some container. In a molten fuel embodiment (not shown), the coolant 106 may be a mixture of uranium and sodium salts in which the mixture is both the primary coolant and the fuel. In a solid fuel embodiment, the fuel may be a solid uranium compound held within one or more containers that are contacted by, or submerged in a pool of, sodium metal or sodium salt coolant.

In any case, the fissionable fuel transfers heat to a primary liquid coolant 106. The coolant 106 may be sodium metal or a sodium salt such as a chloride salt or potassium salt. The coolant 106 may or may not completely fill the vessel 105 that contains the fuel, and the embodiment shown is illustrated with an optional headspace 102, which may be filled with an inert gas such as argon, above the level of the coolant 106. The size of the reactor core 104 is selected based on the characteristics and type of the particular fuel being used in order to achieve and maintain the fuel in an ongoing state of criticality, during which the heat generated by the ongoing production of neutrons in the fuel causes the temperature of the fuel to rise. The performance of the reactor 100 is improved by providing one or more reflectors 108 around the core 104 to reflect neutrons back into the core. The coolant 106 is circulated between the reactor core 104 and one or more primary heat exchangers 110 located outside of the core 104. The circulation may be performed using one or more pumps 112.

The primary heat exchangers 110 transfer heat from the coolant 106 to a secondary coolant 114 that is circulated through a secondary coolant loop 115. In an embodiment the secondary coolant may be sodium or another liquid metal such as lead, or a salt, such as NaCl—MgCl$_2$. In an embodiment, a reflector 108 is between each primary heat exchanger 110 and the reactor core 104 as shown in FIG. 1.

In the embodiment shown, a heated secondary coolant 114 from the primary heat exchangers 110 is passed to a power generation system 120 for the generation of some form of power, e.g., thermal, electrical or mechanical. The reactor core 104, primary heat exchangers 110, pumps 112, sodium coolant circulation piping (including other ancillary components that are not shown such as check valves, shutoff valves, flanges, drain tanks, etc.) and any other components through which the coolant circulates or contacts during operation can be referred to as the primary sodium coolant loop 116. Likewise, the secondary coolant loop 115 includes those components through which secondary coolant circulates, including the primary heat exchangers 110, coolant pumps 113, and secondary coolant circulation piping (including other ancillary components that are not shown such as check valves, shutoff valves, flanges, drain tanks, etc.).

The reactor 100 further includes at least one containment vessel 118 that contains the fuel and other radioactive material to prevent their release in case of an emergency. In a liquid fuel embodiment (as shown), the vessel will surround the primary sodium coolant loop 116 as the coolant is also the fuel. In a solid fuel embodiment, the solid fuel will be contained by the vessel 118 but not all of the sodium coolant loop 116 need be so contained. Note that, depending on the embodiment some or none of the secondary coolant loop 115 need be within the containment vessel 118.

FIG. 1 further discloses a carryover gas handling system 132. The handling system 132 receives carryover gas 128 and treats it for safe discharge to the atmosphere. The handling system 132 includes a gas treatment system 126, a Na—Cs detector 130, and a storage system for storing collected contaminants 124. The handling system 132 may receive carryover gas 128 from the headspace 102, as shown, and/or from any location in the coolant loop 116. The carryover gas 128, which may primarily be an inert gas such as argon, will contain some Na vapor, as well as, volatile fission products including Cs-137 and Rb, and various isotopes of Kr, Xe, and Ar. The carryover gas 128 is then passed through a Na—Cs vapor trap 134 to remove Na and Cs from the carryover gas 128. Additionally, Rb may also be removed at the Na—Cs vapor trap 134 as described further below. Both Na and Cs will interfere with the operation of the downstream treatment systems, so the gas exiting the vapor trap 134 is monitored by the Na—Cs detector 130 to determine the amount of Cs in the carryover gas 128. The carryover gas stream then is passed to the gas treatment system 126 that removes or provides sufficient residence time for the decay of any other contaminants, such as any remaining Rb, in the carryover gas. The cleaned gas 122 is then discharged to the atmosphere or recycled to some part of the power plant. Collected contaminants are kept in a storage system 124 for subsequent disposal.

In the embodiment illustrated in FIG. 1, the carryover gas 128 will include both Na and Cs vapor and also sometimes Rb vapor. As mentioned above, both Na and Cs are detrimental to the operation of gas treatment system 126, but not to the same extent. For example, the acceptable concentration of Cs in carryover gas output from the vapor trap may be less than 0.01 parts per million (ppm) by weight, which may be small when compared to the acceptable concentration of Na. Unless otherwise stated, all concentrations presented in ppm, parts per billion (ppb), or parts per trillion (ppt) will be by weight.

Figure 2:
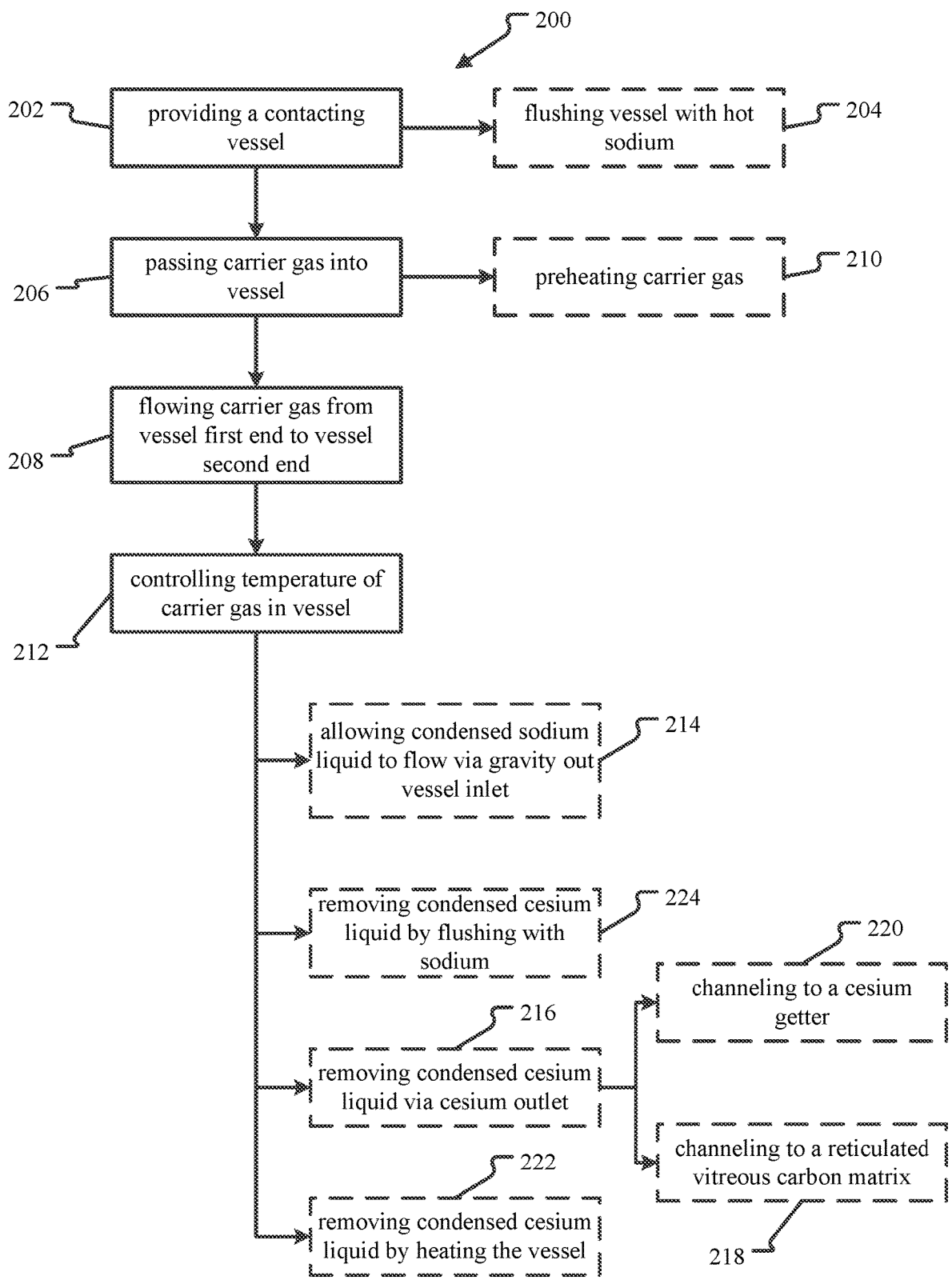
FIG. 2 illustrates an embodiment of a method for removing sodium and cesium from a carryover gas from a nuclear reactor.

FIG. 2 illustrates an embodiment of a method for removing sodium and cesium from a carryover gas from a nuclear reactor. In the embodiment shown, a contacting vessel, described in greater detail below, is provided (illustrated by operation 202) that has an inlet at a first end and a gas outlet at the second end. In an embodiment, the providing operation 202 may include a preconditioning step (operation 204) in which the internals of the contacting vessel, including any packing, are flushed with hot sodium in order to coat all the surfaces within the vessel with sodium prior to the treatment of carryover gas. In an embodiment, the hot sodium may be clean sodium that is discharged from the vessel into the reactor's sodium coolant.

During operation the relative pressures between the inlet and the outlet are maintained so that the carrier gas containing sodium and cesium that enters the vessel through the inlet (operation 206) flows through the vessel and exits via the gas outlet (operation 208). Operation 206 may also include preheating the carrier gas before it enters the vessel to assure only vapor, not aerosol, enters the trap (operation 210). The relative inlet and outlet pressures may be maintained by the use of valves and pumps (not shown) and the pressure drop across the vessel may be actively controlled in order to achieve a desired flow rate of gas through the vessel. In an embodiment, the inlet pressure of the gas is at or less than 10 atm, however, the operation of the vapor trap is anticipated to be not particularly sensitive to the operating pressure and an inlet pressure of at or less than 5 atm, 3 atm or even 1 atm may be used as long as the necessary flow through the vessel may be maintained.

In the method 200, the temperature of gas within the vessel is controlled so that a desired temperature gradient between the inlet and gas outlet is maintained (operation 212). In an embodiment, the gas in the vessel near the inlet is maintained at an initial temperature above the operating temperature of the sodium coolant in the reactor, e.g., above the temperature of the coolant in the reactor vessel 105. In an embodiment, the initial temperature is at least 800° F., however, the initial temperature may be higher, such as at or above 850° F., 900° F., 925° F., 950° F. or even higher, depending on the embodiment. The carrier gas near the outlet of the vessel is maintained at a second temperature sufficiently lower than the initial temperature so that most, if not all, of the sodium and cesium condense into liquid within the vessel and the carrier gas exiting the gas outlet is substantially free of sodium and cesium. Additionally, the temperature at which the cesium condenses into liquid also similarly condenses rubidium into liquid within the vessel such that the carrier gas exiting the gas outlet is substantially free of rubidium.

The word "substantially" is used herein to remind the reader that no treatment system is 100% effective and at least some atoms of sodium and/or cesium may escape with the gas through the outlet. For the purposes of this disclosure, substantially means 99% of the inlet mass of cesium and sodium. Thus, in an embodiment no more than 0.0001% of the sodium and no more than 3% of the cesium that enters the vessel through the inlet exits the gas outlet with the carrier gas. Greater removal may be achieved including, in an embodiment, no more than 0.00001%, 0.000001%, and even 0.00000001% of the sodium and no more than 1%, 0.5%, 0.2%, and even 0.1% of the cesium that enters the vessel through the inlet exits the gas outlet with the carrier gas. In an embodiment, at 1 atm, a gas temperature near the outlet less than at least 220° F. is required to remove substantially all of the sodium and cesium. The temperature may be less, such as at or less than 150° F., 115° F., 100° F., 75° F. and even at or less than 50° F. In an embodiment, the gas temperature near the outlet is set to at or less than 90° F.

In an example calculation, a cylindrical vessel having a 72 inch length and a 6.065 inch inner diameter is modeled to determine the functionality and efficiency of the contacting vessel. The inlet of the vessel is assumed to be 1100° F. and the outlet of the vessel is assumed to be 220° F. with heat tape provided to maintain the temperature gradient. Based on the model calculations, over a runtime period of 24 hours the modeled vessel removes sodium and cesium from the carrier gas such that there is less than 0.06 ppt of sodium in the exhausted carrier gas and less than 2.6 ppb of cesium in the exhausted carrier gas.

The method may include allowing the condensed sodium liquid to flow via gravity out the inlet of the vessel (operation 214). This may be achieved by providing for continuous liquid collection at the bottom of the vessel and routing the collected liquid back into the reactor core.

The method 200 may also include removing the condensed cesium liquid via a cesium outlet located in the vessel between the inlet and the gas outlet (operation 216). Because of the vapor pressure of cesium, unlike sodium, condensed cesium that travels back into a warmer region of the vessel, such as by falling back down a vertically oriented vessel due to gravity, will likely be vaporized by the gas flowing through the vessel and carried back toward the gas outlet where the cesium vapor will be again cooled and condensed. Thus, liquid cesium will collect within the vessel over time. This collection will occur near the gas outlet at some equilibrium temperature which corresponds to a location in the vessel between the inlet and gas outlet. The exact location will vary depending on the design and operating parameters but can be estimated through thermodynamic calculations or determined empirically. In order to facilitate collection and removal of the cesium condensate, a tray, such as a bubble-cap tray, valve tray, sieve tray or any other suitable collector for a distilled fraction, may be provided within the vessel in addition to the packing just above, below or at the location where the cesium liquid collects based on the operating temperatures of the vapor trap such as the inlet temperature, outlet temperature and temperature profile across the vessel. A cesium outlet may also be provided through which the cesium may be periodically removed from the vessel, for example, by channeling the cesium liquid through a reticulated vitreous carbon matrix of a cesium trap for absorption and retention (operation 218).

In some embodiments, the cesium liquid from the outlet may be channeled to a cesium getter that absorbs and retains the cesium (operation 220). By using the cesium getter, the reticulated vitreous carbon system may be removed from the system. In other embodiments, the vessel does not include a cesium outlet and to remove the cesium, the entire vessel is heated to rise the temperature of the condensed cesium therein such that the cesium collected at the tray is vaporized and channeled out the top outlet as a gas where a cesium getter is positioned to absorb and retain the cesium (operation 222). After the cesium is removed from the vessel, the temperature of the vessel is then lowered back down for continued operation. In yet other embodiments, a niobium oxide bed may be used to absorb the cesium gas channeled out of the top outlet of the vessel when heated. The niobium oxide bed may then be used for long term storage, which can be more stable than storing metallic cesium in a cold trap.

In another embodiment, the removal of cesium may not be provided for in the design of the vapor trap. In this embodiment, the method may include periodically disposing of the vessel and the cesium collected therein and installing a new vapor trap. In yet another embodiment, cesium may be removed by periodically flushing the trap with sodium and collecting the effluent (operation 224).

Figure 3:
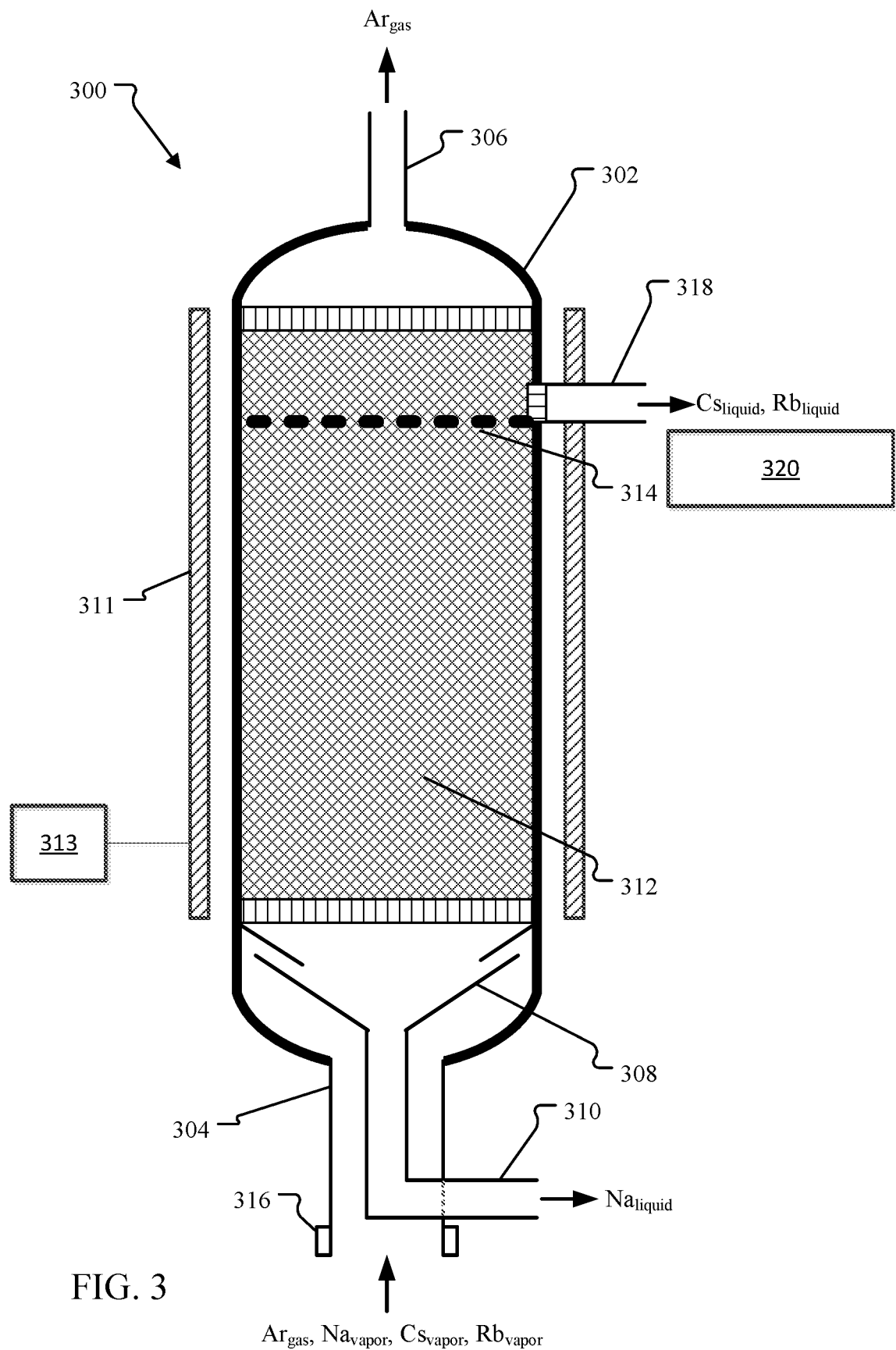
FIG. 3 illustrates an embodiment of a Na—Cs vapor trap.

FIG. 3 illustrates an embodiment of a Na—Cs vapor trap. In the embodiment shown, the vapor trap 300 includes a vertically-oriented column 302 that acts as a contacting vessel. The contacting vessel 302 has an inlet 304 at the bottom and a gas outlet 306 at the top. During continuous operation, the carrier gas containing sodium and cesium is passed through the inlet 304 into the vessel 302 and flows up the vessel until it exits the gas outlet 306 at the top. This vertical configuration takes advantage of gravity and allows the condensed sodium to collect at the bottom of the vessel and flow out the inlet 304 and be returned to the nuclear reactor. In an embodiment, the vapor trap 300 may be built into the top of the reactor vessel so that condensed sodium is directly returned to the reactor vessel via a liquid collector 308 that passes condensate into a return pipe 310 within the inlet 304 as shown.

The vessel 302 may be a packed bed column as shown. The packing 312 may be structured or random. If random packing is used, the packing material may include one or more of beads, fibers, rings, and saddles. Packing material can be composed of glass, metal, ceramics, or other materials that are substantially inert to the carrier gas and any of the components in the carryover gas from the reactor. In an embodiment, the contacting vessel 302 is a packed bed column containing Raschig rings. The packed bed column may also be an annular packed bed column.

A heating system 311 is provided to maintain a temperature gradient between the top and the bottom of the vessel 302. The heating system 311 may include one or more heating elements such as heat tape, a heating jacket around the outside of the column (as illustrated), internal heating elements, or any other suitable heating devices. In an embodiment, for example, the center of an annular packed bed column includes a heating element for controlling the temperature of the gas within the column.

A controller 313 may also be provided for controlling the heating elements, the flow of gas, or both. In an embodiment, the controller 313 is adapted to maintain a temperature gradient across the contacting vessel between a first selected temperature at the first end and a second selected temperature at the second end. The heating system 311 may be designed to further allow the temperature at regions within the column to be selectively and independently controlled by the operator. In some embodiments, the heating system 311 is designed to heat the entire vessel to raise the temperature such that the cesium collected at the tray 314 is vaporized and channeled out the top gas outlet 316. During such a heating operation, outlet gas flow may be diverted to a specific component for capturing the cesium. For example, during cesium purging the outlet gas flow may be diverted to a cesium getter, a niobium oxide bed, or some other component to absorb and retain the cesium.

The vessel 302 need not be vertically-oriented with the warmer inlet 304 at the bottom and cooler outlet 306 at the top as shown, however, the vertical orientation allows the liquid sodium to be easily removed, by gravity, through the inlet 304 via the liquid collector 308 at the bottom of the vessel 308 and the liquid return pipe 310 within the inlet pipe as shown. Alternate configurations are possible such as a diagonal orientation or even a horizontal orientation. Likewise, one or more liquid sodium and liquid cesium outlets may be located in different places on the vessel depending on the orientation of the vessel.

In an embodiment, the vapor trap is operated so that the inlet temperature is above the operating temperature of the sodium coolant in the reactor, e.g., above the temperature of the coolant in the reactor vessel 105, such as greater than 925° F., and the outlet temperature is less than 115° F. or 120° F.

As described above, a tray 314 may be provided within the contacting vessel to collect liquid cesium. The location where cesium will collect within the vessel may be determined by thermodynamic calculations based on the inlet and outlet temperatures as well as the temperature gradient and expected or known temperatures at various locations along the column. A cesium removal outlet 318 in the contacting vessel may be provided to remove cesium from the tray 314. In some embodiments, the outlet 318 is coupled in flow communication with a cesium absorber 320. For example, the absorber may be a cesium getter or a reticulated vitreous carbon matrix. The location of the tray within the vessel also collects rubidium which condenses at corresponding temperatures to that of cesium. As such, the vapor trap also enables rubidium to be extracted from the carrier gas.

The various inlets and outlets of the contacting vessel may be provided with valves (not shown) that may be operated manually, automatically or both. In addition, one or more of the inlets and outlets of the contacting vessel may be provided detectors, e.g., a Na—Cs detector in the inlet 304 and gas outlet 306, and flow meters to monitor the flows into and out of the vessel 302.

A preheater 316 may be provided that preheats the carrier gas containing at least some sodium and cesium to the first temperature before it is received via the inlet 304. In an embodiment, the preheater 316 may simply be a heated section of piping before the inlet 304 as illustrated. In an alternative embodiment, a heat exchanger may be used to preheat the carryover gas before it is delivered to the contacting vessel 302.

As discussed above, the vapor trap may be operated at any desired pressure as long as flow through the vessel can be achieved. In an embodiment, an inlet pressure of at or below 10 atm, 5 atm, 3 atm or even 1 atm may be used.

Notwithstanding the appended claims, the disclosure is also defined by the following clauses:

1. A method for removing sodium and cesium from a carrier gas comprising:
providing a vessel having an inlet at a first end and a gas outlet at the second end;
passing the carrier gas containing sodium and cesium into the inlet of the vessel;
flowing the carrier gas from the first end to the second end and out via the gas outlet; and
controlling the temperature of the carrier gas such that carrier gas at the first end of the vessel is at a first temperature above 800° F. and the carrier gas at the second end of the vessel is at a second temperature less than 220° F., thereby causing the sodium and cesium to condense into liquid within the vessel such that the carrier gas exiting the gas outlet is substantially free of sodium and cesium.

2. The method of the above clause further comprising:
allowing the condensed sodium liquid to flow via gravity out the inlet of the vessel.
3. The method of any one of the above clauses further comprising:
removing the condensed cesium liquid via the inlet by flushing the vessel with sodium.
4. The method of any one of the above clauses further comprising:
removing the condensed cesium liquid via a cesium outlet located in the vessel between the inlet and the gas outlet.
5. The method of any one of the above clauses further comprising:
channeling the condensed cesium liquid to a cesium getter via the cesium outlet.
6. The method of any one of clauses 1-4 further comprising:
channeling the condensed cesium liquid to a reticulated vitreous carbon matrix via the cesium outlet.
7. The method of any one of the above clauses further comprising:
removing the condensed cesium liquid by heating the vessel such that the cesium liquid vaporizes and is channeled out of the gas outlet and to a cesium getter.
8. The method of any one of the above clauses further comprising:
wherein no more than 0.0001% of the sodium and no more than 1% of the cesium that enters the vessel through the inlet exits the gas outlet with the carrier gas.
9. The method of any one of the above clauses further comprising:
before passing the carrier gas into the vessel, flushing the vessel with hot sodium to coat surfaces of the vessel.
10. The method of any one of the above clauses further comprising:
preheating the carrier gas before entering the vessel.
11. A system for removing sodium and cesium from a carrier gas stream received from a sodium-cooled nuclear reactor comprising:
a contacting vessel;
an inlet at a first end of the contacting vessel adapted to receive carrier gas at an inlet pressure of less than 10 atm, the received carrier gas containing at least some sodium and cesium;
an outlet at a second end of the contacting vessel adapted to discharge carrier gas at an outlet pressure less than the inlet pressure; and
a heating system including at least one heating element and a controller adapted to maintain a temperature gradient across the contacting vessel between a first temperature at the first end of the vessel greater than an operating temperature of sodium coolant in the sodium-cooled nuclear reactor and a second temperature at the second end of the vessel less than 220° F.
12. The system of clause 11 wherein the first temperature is greater than 925° F. and the second temperature is less than 120° F.
13. The system of any one of clauses 11-12 further comprising a tray within the contacting vessel between the inlet and the outlet, wherein the tray is located in the contacting vessel at a point where liquid cesium collects within the contacting vessel based on the first and second temperature.
14. The system of any one of clauses 11-13 wherein the outlet is a first outlet and the system further comprises a second outlet in the contacting vessel between the inlet and the first outlet, the second outlet located in the contacting vessel at a point where liquid cesium collects within the contacting vessel based on the first and second temperature.

15. The system of any one of clauses 11-14 wherein the second outlet is coupled in flow communication to a cesium getter.

16. The system of any one of clauses 11-14 wherein the second outlet is coupled in flow communication with a reticulated vitreous carbon matrix.

17. The system of any one of clauses 11-16 further comprising a liquid outlet at the first end of the contacting vessel.

18. The system of any one of clauses 11-17 further comprising a preheater that preheats the carrier gas containing at least some sodium and cesium to the first temperature before it is received via the inlet.

19. The system of any one of clauses 11-18 wherein the inlet pressure is less than 3 atm.

20. The system of any one of clauses 11-19 wherein the contacting vessel is a packed bed column containing a structured or random packing material.

21. The system of any one of clauses 11-20 wherein the random packing material is selected from one or more of beads, fibers, rings, and saddles.

22. The system of any one of clauses 11-21 wherein the contacting vessel is a packed bed column containing Raschig rings.

23. The system of any one of clauses 11-22 wherein the contacting vessel is an annular packed bed column containing Raschig rings.

Notwithstanding that the numerical ranges and parameters setting forth the broad scope of technology are approximations, the numerical values set forth in the specific examples are reported as precisely as possible. Any numerical value, however, inherently contains certain errors necessarily resulting from the standard deviation found in their respective testing or calculation measurements.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. For example, the cesium tray may be constructed such that liquid cesium collected by the tray is directed into a removable, shielded liquid cesium collection reservoir internal to the vessel. Such a reservoir could be provided with a sensor and/or special temperature management systems so that the cesium, once collected, is maintained at a suitable temperature and in a suitable environment removed from the flowing gas within the packing of the vessel. Numerous other changes may be made which will readily suggest themselves to those skilled in the art and which are encompassed in the spirit of the disclosure.

What is claimed is:

1. A system for removing sodium and cesium from a carrier gas stream received from a sodium-cooled nuclear reactor comprising:
    a contacting vessel;
    an inlet at a first end of the contacting vessel adapted to receive the carrier gas stream at an inlet pressure of less than 10 atm, the received carrier gas stream containing at least some sodium and cesium;
    an outlet at a second end of the contacting vessel adapted to discharge carrier gas at an outlet pressure less than the inlet pressure;
    a heating system including at least one heating element and a controller adapted to maintain a temperature gradient across the contacting vessel between a first temperature at the first end of the vessel greater than an operating temperature of sodium coolant in the sodium-cooled nuclear reactor and a second temperature at the second end of the vessel less than 220° F.; and
    a tray within the contacting vessel between the inlet and the outlet, wherein the tray is located in the contacting vessel at a point where liquid cesium collects within the contacting vessel based on the first and second temperature.

2. The system of claim 1 wherein the first temperature is greater than 925° F. and the second temperature is less than 120° F.

3. The system of claim 1 wherein the outlet is a first outlet and the system further comprises a second outlet in the contacting vessel between the inlet and the first outlet, the second outlet located in the contacting vessel at a point where liquid cesium collects within the contacting vessel based on the first and second temperature.

4. The system of claim 3 wherein the second outlet is coupled in flow communication to a cesium getter.

5. The system of claim 3 wherein the second outlet is coupled in flow communication with a reticulated vitreous carbon matrix.

6. The system of claim 1 further comprising a liquid outlet at the first end of the contacting vessel.

7. The system of claim 1 further comprising a preheater that preheats the carrier gas containing at least some sodium and cesium to the first temperature before it is received via the inlet.

8. The system of claim 1 wherein the inlet pressure is less than 3 atm.

9. The system of claim 1 wherein the contacting vessel is a packed bed column containing a structured or random packing material.

10. The system of claim 9 wherein the random packing material is selected from one or more of beads, fibers, rings, and saddles.

11. The system of claim 1 wherein the contacting vessel is a packed bed column containing Raschig rings.

12. The system of claim 1 wherein the contacting vessel is an annular packed bed column containing Raschig rings.

13. A system for removing sodium and cesium from a carrier gas stream received from a sodium-cooled nuclear reactor comprising:
    a contacting vessel;
    an inlet at a first end of the contacting vessel adapted to receive the carrier gas stream at an inlet pressure of less than 10 atm, the received carrier gas stream containing at least some sodium and cesium;
    a first outlet at a second end of the contacting vessel adapted to discharge carrier gas at an outlet pressure less than the inlet pressure;

a heating system including at least one heating element and a controller adapted to maintain a temperature gradient across the contacting vessel between a first temperature at the first end of the vessel greater than an operating temperature of sodium coolant in the sodium-cooled nuclear reactor and a second temperature at the second end of the vessel less than 220° F.; and a second outlet in the contacting vessel between the inlet and the first outlet, the second outlet located in the contacting vessel at a point where liquid cesium collects within the contacting vessel based on the first and second temperature.

14. The system of claim 13 wherein the first temperature is greater than 925° F. and the second temperature is less than 120° F.

15. The system of claim 13 further comprising a tray within the contacting vessel between the inlet and the first outlet, wherein the tray is located in the contacting vessel at a point where liquid cesium collects within the contacting vessel based on the first and second temperature.

16. The system of claim 13 wherein the second outlet is coupled in flow communication to a cesium getter.

17. The system of claim 13 wherein the second outlet is coupled in flow communication with a reticulated vitreous carbon matrix.

18. The system of claim 13 further comprising a liquid outlet at the first end of the contacting vessel.

19. The system of claim 13 further comprising a preheater that preheats the carrier gas containing at least some sodium and cesium to the first temperature before it is received via the inlet.

20. The system of claim 13 wherein the inlet pressure is less than 3 atm.

21. The system of claim 13 wherein the contacting vessel is a packed bed column containing a structured or random packing material.

22. The system of claim 21 wherein the random packing material is selected from one or more of beads, fibers, rings, and saddles.

23. The system of claim 13 wherein the contacting vessel contains a plurality of Raschig rings.

* * * * *